(12) United States Patent
Son

(10) Patent No.: US 7,409,857 B2
(45) Date of Patent: Aug. 12, 2008

(54) JIG FOR IDENTIFYING TYPE OF WHEEL NUT AND MOUNTING THE SAME

(75) Inventor: Hoon Son, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 11/639,498

(22) Filed: Dec. 14, 2006

(65) Prior Publication Data

US 2008/0110251 A1    May 15, 2008

(30) Foreign Application Priority Data

Oct. 10, 2006    (KR) ...................... 10-2006-0098319

(51) Int. Cl.
*G01M 17/02*    (2006.01)
(52) U.S. Cl. ...................................................... 73/146
(58) Field of Classification Search ........ 73/146–146.8; 340/442–447
See application file for complete search history.

(56) References Cited

U.S. PATENT DOCUMENTS 4,553,456 A * 11/1985 Rafert .......................... 81/462

FOREIGN PATENT DOCUMENTS

| JP |  7-032232  |   | 2/1995 |
|----|------------|---|--------|
| JP | 2000-210824 |   | 8/2000 |
| JP | 2000-210825 |   | 8/2000 |
| JP | 2007030165 A | * | 2/2007 |
| JP | 2007211871 A | * | 8/2007 |

* cited by examiner

*Primary Examiner*—Andre J. Allen
*Assistant Examiner*—Jermaine Jenkins
(74) *Attorney, Agent, or Firm*—Peter F. Corless; Edwards Angell Palmer & Dodge, LLP

(57) ABSTRACT

Disclosed herein is a jig for identifying a type of wheel nut and mounting the wheel nut, comprising a base plate provided with a plurality of sets of temporary assembly pins, wherein the plurality of sets of temporary assembly pins are classified depending on the kind of a vehicle.

9 Claims, 3 Drawing Sheets

JIG FOR IDENTIFYING TYPE OF WHEEL NUT AND MOUNTING THE SAME

CROSS-REFERENCE TO RELATED APPLICATIONS

The present application is based on and claims priority from Korean Patent Application Serial Number 10-2006-0098319 filed with the Korean Intellectual Property Office on Oct. 10, 2006, the disclosure of which is hereby incorporated by reference herein in its entirety.

FIELD OF THE INVENTION

The present invention relates to a jig for identifying types of wheel nuts and mounting the wheel nuts, which can identify a proper wheel nut corresponding to a particular kind of vehicle that is moved along an assembly line by a shuttle during a wheel assembly process, and hold the wheel nut by means of a nut runner.

BACKGROUND

Generally, in a vehicle assembly process, a wheel is assembled by fitting a wheel over a wheel assembly of a vehicle body that is moved on a shuttle and by coupling wheel nuts to the wheel assembly.

During the above process, workers use a tool, which is called a nut runner, to facilitate the process of coupling the wheel nuts to each wheel.

Workers must identify the kind of vehicle moving along the assembly line, select wheel nuts suitable for particular kinds of vehicle, and insert the selected wheel nuts into respective sockets of the nut runner.

In the conventional process of coupling the wheel nuts, however, workers must pay careful attention to correctly identify particular kinds of vehicle moving along the assembly line on the shuttle. In addition, excessive time is required to conduct preparation work of selecting wheel nuts corresponding to particular kinds of vehicle and inserting the wheel nuts into the respective sockets of the nut runner, thereby increasing the overall processing time. Also, workers may mistakenly couple incorrect kinds of wheel nuts to a vehicle.

There is thus a need for an improved tool that can mount wheel nuts to vehicles in a shortened time and a reliable manner.

SUMMARY OF THE INVENTION

In one aspect, the present invention provides a jig for identifying a type of wheel nut and mounting the wheel nut, comprising a base plate provided with a plurality of sets of temporary assembly pins, wherein the plurality of sets of temporary assembly pins are classified depending on the kind of a vehicle.

In a preferred embodiment of the present invention, such jig may further comprise: a plurality of vehicle class indicators provided on the base plate, each of which indicates the set of wheel nuts corresponding to the kind of vehicle; and a control unit to operate one of the vehicle class indicators corresponding to the kind of vehicle determined by a vehicle class identifying device during a wheel assembly process.

Preferably, wheel nuts are classified and temporarily fitted over particular temporary assembly pins depending on the kind of vehicles.

Suitably, each of the temporary assembly pins may comprises: a flange part seated on a surface of the base plate; a pin part protruding from the flange part and inserted into a tapping part of the associated wheel nut to support the wheel nut; and a nut part inserted into each of holes of the base plate and fastened to the base plate using a bolt.

Also suitably, temporary assembly pins may be arranged and classified in a particular set on the base plate according to the kinds of vehicle, such that the temporary assembly pins in each set are disposed at positions adjacent to each other and corresponding to positions of sockets of a nut runner.

In another preferred embodiment, each set of temporary assembly pins comprise a vehicle class indicator, preferably, at its center portion.

Preferably, vehicle class indicator may comprise a plurality of visibility devices. The visibility devices are designed to be turned on or off independently of each other depending on the signal from the control unit.

Such visibility devices may suitably comprise color bulbs that are visibly distinguished from each other depending on the kind of vehicle.

In still another embodiment, the base plate may be provided with a carrying handle.

In another aspect, the present invention provides a method of assembling a wheel nut to a vehicle body, comprising the steps of: classifying wheel nuts into a plurality of sets depending on the kind of vehicle; temporarily fitting the wheel nuts over a plurality of sets of temporary assembly pins depending on the kind of vehicle, wherein the plurality of sets of temporary assembly pins are spaced from each other and each set has a vehicle class indicator at its center portion; identifying the kind of the vehicle that is moved by a shuttle during a wheel assembly process; and selectively turning on the vehicle class indicator corresponding to the identified kind of vehicle.

Such jigs and method of assembling a wheel nut to a vehicle body by using the jigs achieves the purpose of the present invention. In other words, the present jigs and method can automatically identify the kind of vehicle moving along an assembly line on a shuttle during a wheel assembly process, select particular wheel nuts corresponding to the kind of vehicle, and mount the wheel nuts to a nut runner by using the method in which the wheel nuts are temporarily set at desired positions for a work waiting time and are then inserted into respective sockets of the nut runner, thereby reducing the time required to mount the wheel nuts to the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present jigs and method will be particularly useful with a wide variety of motor vehicles.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
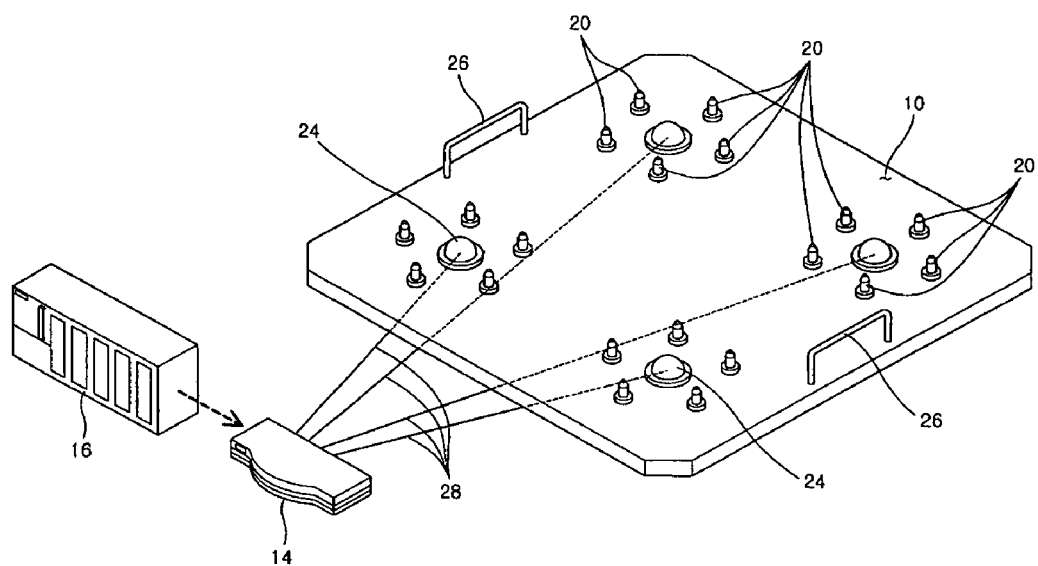
FIG. 1 is a view illustrating a jig for identifying the type of wheel nut and mounting the wheel nut, according to an embodiment of the present invention.
Figure 2:
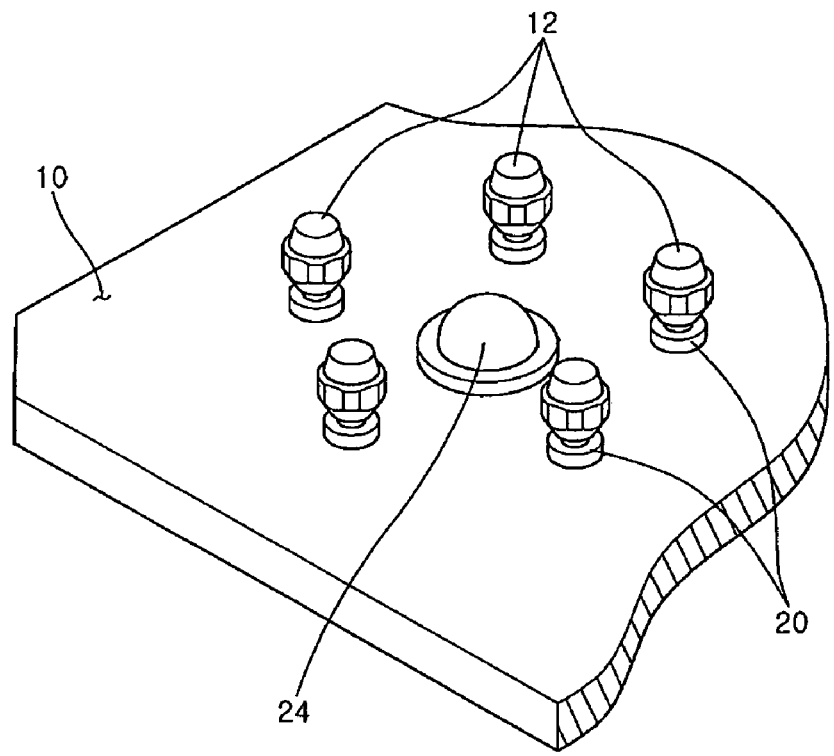
FIG. 2 is an enlarged view showing a critical part of the jig of FIG. 1.
Figure 3:
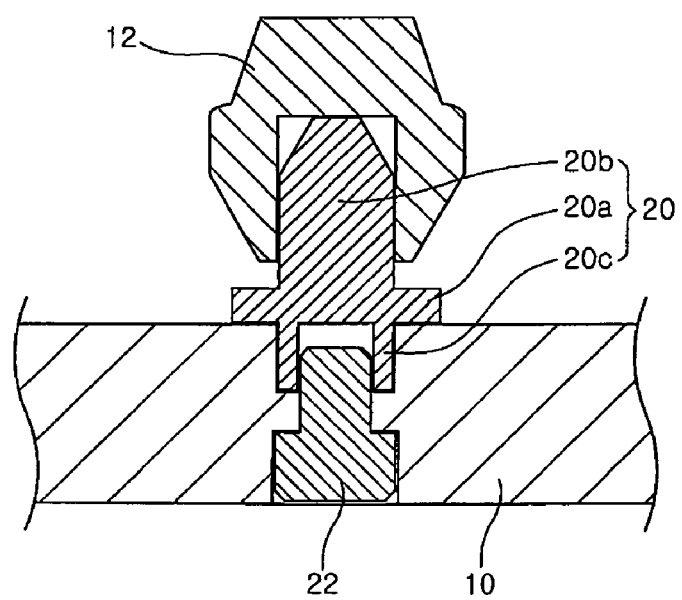
FIG. 3 is a sectional view showing a wheel nut fitted over a temporary assembly pin according to the present invention.
Figure 4:
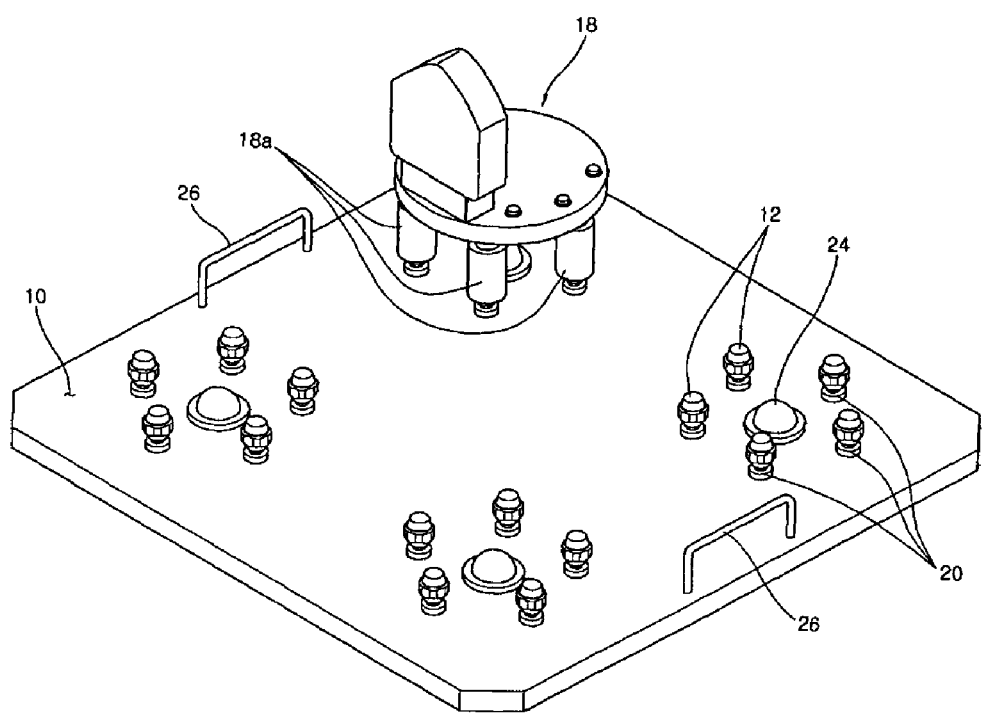
FIG. 4 is a view showing the state in which a nut runner holds a set of wheel nuts at one time.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

As shown in the drawings, several sets of wheel nuts 12, classified depending on the kind of vehicle, are temporarily mounted to a base plate 10 at separate positions. A plurality of vehicle class indicators is provided on the base plate 10 and serves to indicate the set of wheel nuts 12 corresponding to the kind of vehicle. A vehicle class identifying device 16 identifies the vehicle that is moved by a shuttle during a wheel assembly process. Depending on the kind of vehicle, a control unit 14 controls the vehicle class indicators such that only the vehicle class indicator corresponding to the identified kind of vehicle is operated.

The present invention facilitates both the identification of wheel nuts 12 corresponding to the kind of vehicle during a process of mounting the wheel nuts 12 for assembly of the wheel and a process of mounting the wheel nuts 12 using the nut runner 18, which couples the wheel nuts 12 to the wheel.

To achieve the above purposes, several sets of temporary assembly pins 20 that are classified depending on the kind of vehicle are provided on the base plate 10. The wheel nuts 12 are temporarily fitted over the respective temporary assembly pins 20.

Each temporary assembly pin 20 comprises: a flange part 20a, which is seated on the surface of the base plate 10; a pin part 20b, which protrudes from the flange part 20a and is inserted into a tapping part of the associated wheel nut 12 to support the wheel nut 12; and a nut part 20c, which is inserted into each through hole of the base plate 10 and is fastened to the base plate 10 by engagement with a bolt 22 that is inserted into the through hole through the rear surface of the base plate 10. The diameter of the pin part 20b of the temporary assembly pin 20 is smaller than the inner diameter of the tapping part of the associated wheel nut 12, such that the wheel nut 12 is easily and removably fitted over the temporary assembly pin 20.

Temporary assembly pins 20 are arranged on the base plate 10 and classified into a plurality of sets corresponding to the kinds of vehicle. Here, the plurality of sets of temporary assembly pins 20 are spaced apart from each other on the base plate 10, so that when the wheel nuts 12 are fitted over a set of temporary assembly pins 20 by the nut runner 18, other sets of wheel nuts 12 are prevented from interfering with the nut runner 18.

The temporary assembly pins 20 in each set are disposed at positions corresponding to sockets 18a of the associated nut runner 18 for mounting the wheel nuts 12. The reason for this is that the sockets 18a of the nut runner 18 easily hold the wheel nuts 12 at one time.

Meanwhile, the vehicle class indicators may comprise a plurality of visibility devices that can selectively and independently turn on lights depending on information about the kind of vehicle obtained by the vehicle class identifying device 16. The visibility devices are controlled by the control unit 14.

The visibility devices may preferably comprise color bulbs 24 which are visibly distinguished from each other depending on the kind of vehicle. Each color bulb 24 is disposed on the base plate 10 at the center of each set of temporary assembly pins 20, which are provided on the base plate 10 at predetermined positions spaced apart by distances depending on the kind of vehicle.

That is, the temporary assembly pins 20 in each set, which are disposed adjacent to each other on the base plate 10, are radially spaced apart from the associated color bulb 24 on the base plate 10, so that workers can easily distinguish the wheel nuts 12 depending on the kind of vehicle. Furthermore, because each color bulb 24 is disposed at the center of each set of wheel nuts 12, which are disposed adjacent to each other on the base plate 10, workers can easily recognize it.

Meanwhile, carrying handles 26 are provided on opposite ends of the base plate 10 such that the worker is able to easily carry the base plate 10.

In the drawings, the reference numeral 28 denotes wires which electrically connect the respective color bulbs 24 to the control unit 14.

As discussed above, in another aspect, the present invention provides a method of assembling a wheel nut to a vehicle body, comprising the steps of: classifying wheel nuts into a plurality of sets depending on the kind of vehicle; temporarily fitting the wheel nuts over a plurality of sets of temporary assembly pins depending on the kind of vehicle, wherein the plurality of sets of temporary assembly pins are spaced from each other and each set has a vehicle class indicator at its center portion; identifying the kind of the vehicle that is moved by a shuttle during a wheel assembly process; and selectively turning on the vehicle class indicator corresponding to the identified kind of vehicle.

The operation of the jig for identifying the type of wheel nut and mounting the wheel nut according to the present invention will be described in detail herein below.

First, workers conduct a preparatory process in which several kinds of wheel nuts 12 are fitted over the corresponding several sets of temporary assembly pins 20, which are disposed on the base plate 10 at predetermined positions spaced apart by distances depending on the kind of vehicle.

Subsequently, when a vehicle is moved by the shuttle to the position at which the wheel assembly process is conducted, the vehicle class identifying device 16 identifies the kind of vehicle and sends information to the control unit 14.

Depending on the input information, the control unit 14 outputs a signal to turn on the associated color bulb 24, which is disposed at a central portion of the associated set of temporary assembly pins 20, which are placed adjacent to each other on the base plate 10.

Then, workers insert the wheel nuts 12, which are fitted over the temporary assembly pins 20 disposed around the turned-on color bulb 24, into the sockets 18a of the nut runner 18 such that the set of wheel nuts 12 is held by the sockets 18a of the nut runner 18. Thereafter, workers can fit the sockets 18a of the nut runner 18 to wheel bolts of the vehicle and operate the nut runner 18. Then, the wheel nuts 12 are coupled to the wheel bolts of the vehicle.

After such a process has been completed, during a waiting time in which the vehicle is moved by the shuttle for assembly of a subsequent wheel, workers can fit corresponding wheel nuts 12 over the empty temporary assembly pins 20 on the base plate 10, thereby preparing for a subsequent wheel nut coupling process.

As such, in the wheel assembly process, the process of temporarily mounting the wheel nuts 12 to the sockets 18a of the nut runner 18 can be conducted at one time using the base plate 10 which comprises a the number of sets of temporary assembly pins 20 corresponding to the number of vehicle classes.

Furthermore, the color bulbs 24, which are disposed on the base plate 10 at central positions of the temporary assembly pins 20 in the respective sets, facilitate identification of the kind of vehicle, thereby reducing the possibility of incorrect coupling of wheel nuts 12 to the vehicle.

Moreover, according to the present invention, it is possible to conduct the process of temporarily mounting the wheel nuts 12 to the sockets 18a of the nut runner 18 at one time. The process of coupling the wheel nuts 12 to the wheel bolts of the vehicle can be also conducted at one time by the nut runner 18. Therefore, the overall work time required to mount the wheel nuts 12 to the vehicle is reduced. In addition, the present invention reduces workers burden that they must correctly identify the wheel nuts 12 depending on the kind of vehicle every time the wheel nuts 12 are mounted to the vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A jig for identifying a type of wheel nut and mounting the wheel nut, comprising a base plate provided with a plurality of sets of temporary assembly pins, wherein the plurality of sets of temporary assembly pins are classified depending on the kind of a vehicle wherein a plurality of vehicle class indicators provided on the base plate, each of which indicates the set of wheel nuts corresponding to the kind of vehicle; and a control unit to operate one of the vehicle class indicators corresponding to the kind of vehicle determined by a vehicle class identifying device during a wheel assembly process.

2. The jig as defined in claim 1, wherein the wheel nuts are classified and temporarily fitted over respective temporary assembly pins.

3. The jig as defined in claim 2, wherein each of the temporary assembly pins comprises: a flange part seated on a surface of the base plate; a pin part protruding from the flange part and inserted into a tapping part of the associated wheel nut to support the wheel nut; and a nut part inserted into each of holes of the base plate and fastened to the base plate using a bolt.

4. The jig as defined in claim 3, wherein the temporary assembly pins are arranged and classified in a particular set on the base plate according to the kinds of vehicle, such that the temporary assembly pins in each set are disposed at positions adjacent to each other and corresponding to positions of sockets of a nut runner.

5. The jig as defined in claim 4, wherein each set of the temporary assembly pins comprise a vehicle class indicator disposed at its central portion.

6. The jig as defined in claim 1, wherein the vehicle class indicator comprises a plurality of visibility devices to be turned on or off independently of each other depending on the signal from the control unit.

7. The jig as defined in claim 6, wherein the visibility devices comprise color bulbs that are visibly distinguished from each other depending on the kind of vehicle.

8. The jig as defined in claim 1, wherein a carrying handle is provided on the base plate.

9. A method of assembling a wheel nut to a vehicle body, comprising the steps of:
    classifying wheel nuts into a plurality of sets depending on the kind of vehicle;
    temporarily fitting the wheel nuts over a plurality of sets of temporary assembly pins depending on the kind of vehicle, wherein the plurality of sets of temporary assembly pins are spaced from each other and each set has a vehicle class indicator at its center portion;
    identifying the kind of the vehicle that is moved by a shuttle during a wheel assembly process; and
    selectively turning on the vehicle class indicator corresponding to the identified kind of vehicle.

* * * * *